(12) United States Patent
Raab et al.

(10) Patent No.: US 6,543,411 B2
(45) Date of Patent: Apr. 8, 2003

(54) METHOD FOR GENERATING A HOMOGENEOUS MIXTURE FOR AUTO-IGNITION INTERNAL COMBUSTION ENGINES AND FOR CONTROLLING THE COMBUSTION PROCESS

(75) Inventors: Alois Raab, Böbingen a.d. Rems (DE); Martin Schnabel, Aalen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/792,591

(22) Filed: Feb. 23, 2001

(65) Prior Publication Data

US 2001/0017123 A1 Aug. 30, 2001

(30) Foreign Application Priority Data

Feb. 26, 2000 (DE) .......................................... 100 09 180

(51) Int. Cl.[7] .............................. F02B 3/08; F02M 25/07
(52) U.S. Cl. ................. 123/305; 123/568.14; 123/58.8; 123/299
(58) Field of Search ................................. 123/299, 305, 123/316, 58.8, 90.15, 90.16, 568.11, 568.12, 568.14

(56) References Cited

U.S. PATENT DOCUMENTS

| | | | | |
|---|---|---|---|---|
| 4,059,076 A | * | 11/1977 | Kosaka et al. ............. | 123/58.8 |
| 4,131,095 A | * | 12/1978 | Ouchi ....................... | 123/58.8 |
| 4,735,186 A | * | 4/1988 | Parsons ................. | 123/568.15 |
| 5,297,515 A | * | 3/1994 | Gale et al. ................. | 123/58.8 |
| 5,915,472 A | * | 6/1999 | Takikawa et al. ........... | 165/158 |
| 6,125,801 A | * | 10/2000 | Mendler ................ | 123/568.14 |
| 6,178,933 B1 | * | 1/2001 | Lavy ......................... | 123/58.8 |
| 6,305,364 B1 | * | 10/2001 | Ma ....................... | 123/568.14 |
| 6,386,177 B2 | * | 5/2002 | Urushihara et al. .... | 123/568.14 |

FOREIGN PATENT DOCUMENTS

DE 692 18 342 6/1997

* cited by examiner

Primary Examiner—Willis R. Wolfe
(74) Attorney, Agent, or Firm—Kenyon & Kenyon

(57) ABSTRACT

A method for generating a homogeneous mixture for auto-ignition internal combustion engines and for controlling the combustion process, the internal combustion engine having an injection system and at least one cylinder/piston unit connected to an intake device, includes the steps of:

a) exhaust-gas recirculation of hot exhaust gas from a previous combustion cycle into the combustion space or into the intake device or exhaust-gas retention of this exhaust gas in the combustion space or in the intake device;

b) injection of fuel by the injection system into the retained or recirculated hot exhaust gas in order to generate a homogeneous fuel/air mixture; and c) cooling of the homogenized fuel/air mixture by expansion cooling or by isentropic compression in the respective cylinder/piston unit and/or by expansion cooling or by external cooling of a fuel/air mixture homogenized in at least one further cylinder/piston unit and recirculation of the cooled fuel/air mixture into the intake device.

13 Claims, 8 Drawing Sheets

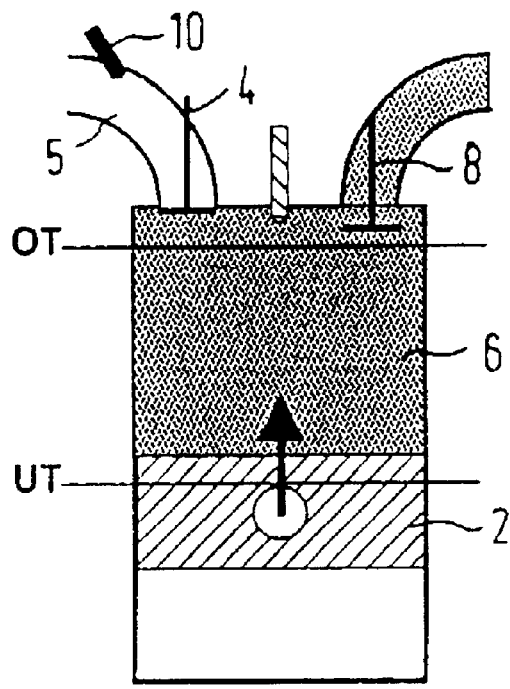
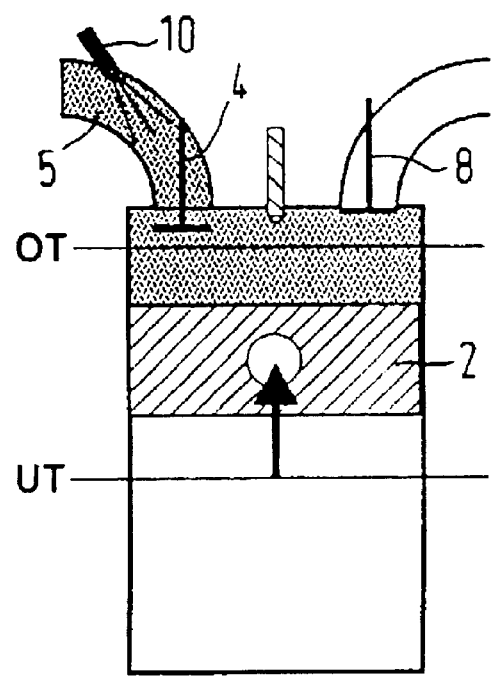
FIG. 3a  FIG. 3b
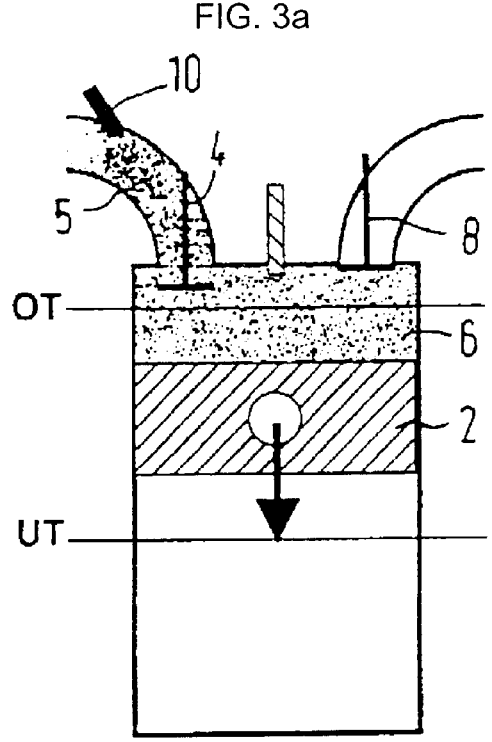
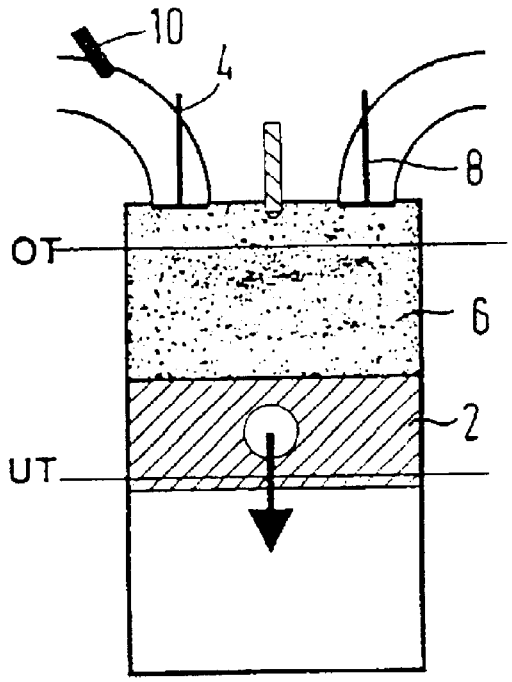
FIG. 3c  FIG. 3d

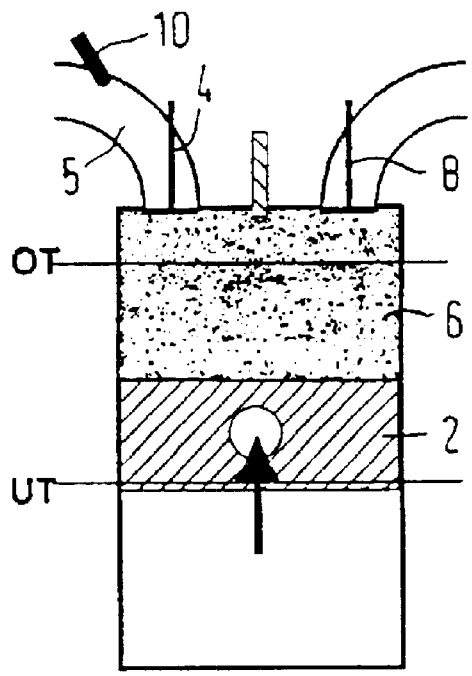
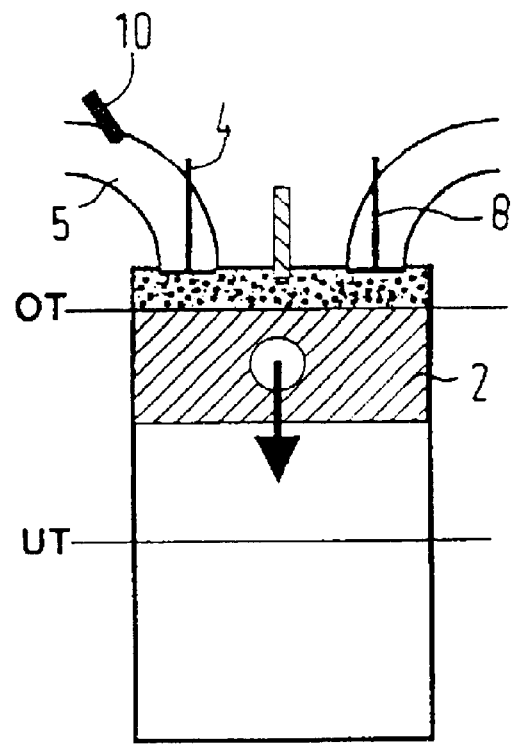
FIG. 3e  FIG. 3f
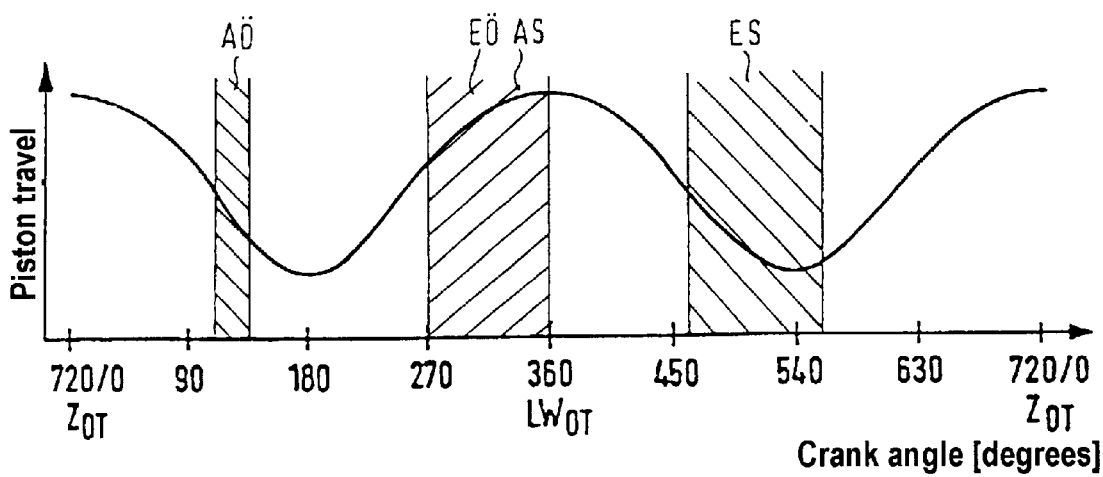
FIG. 4

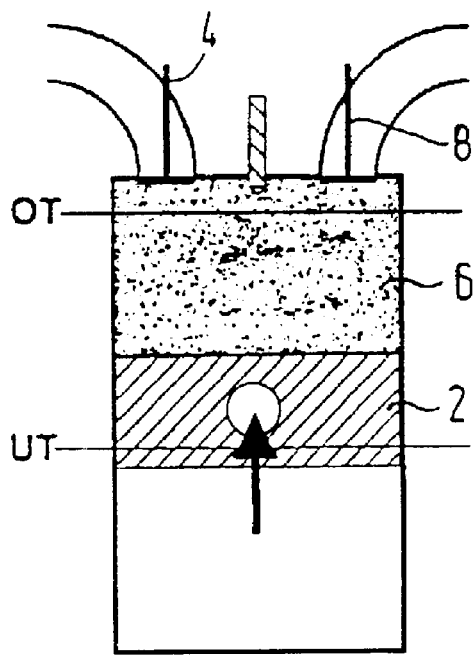 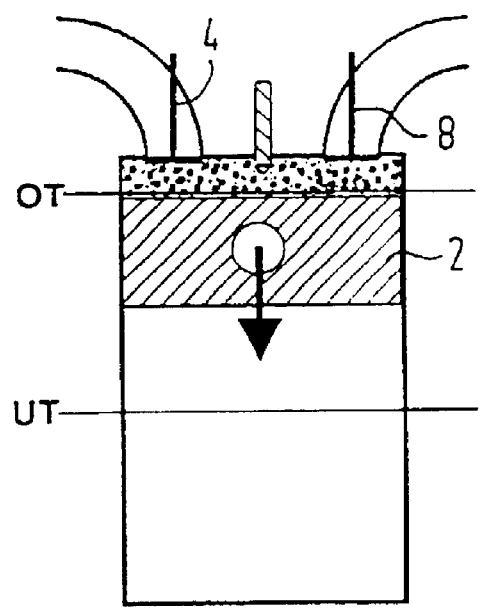
FIG. 5e          FIG. 5f
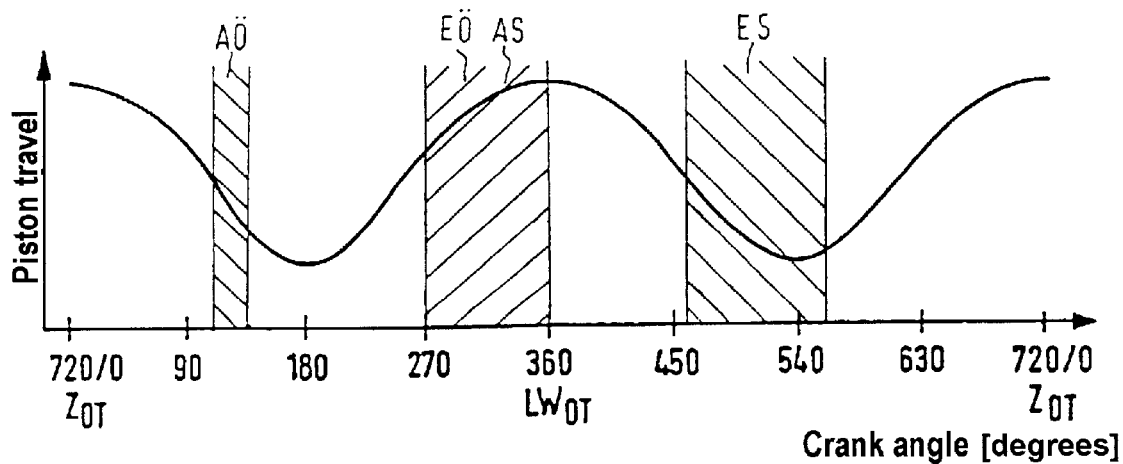
FIG. 6

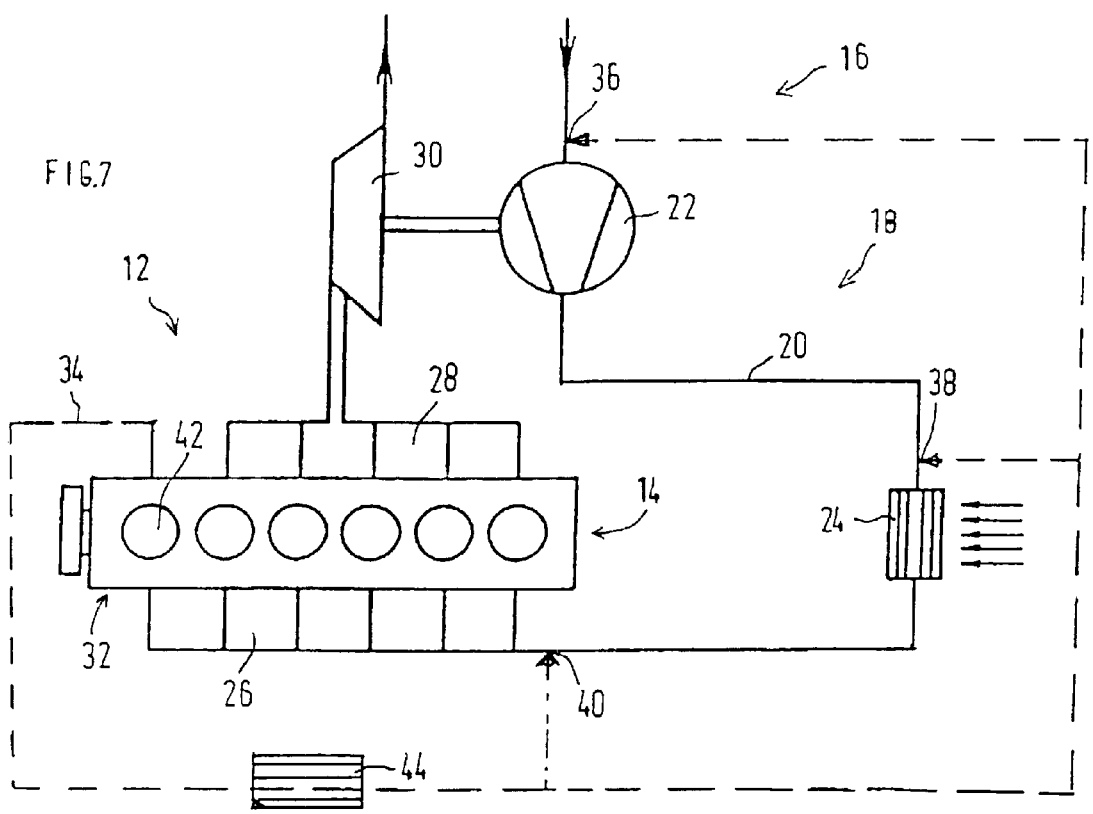
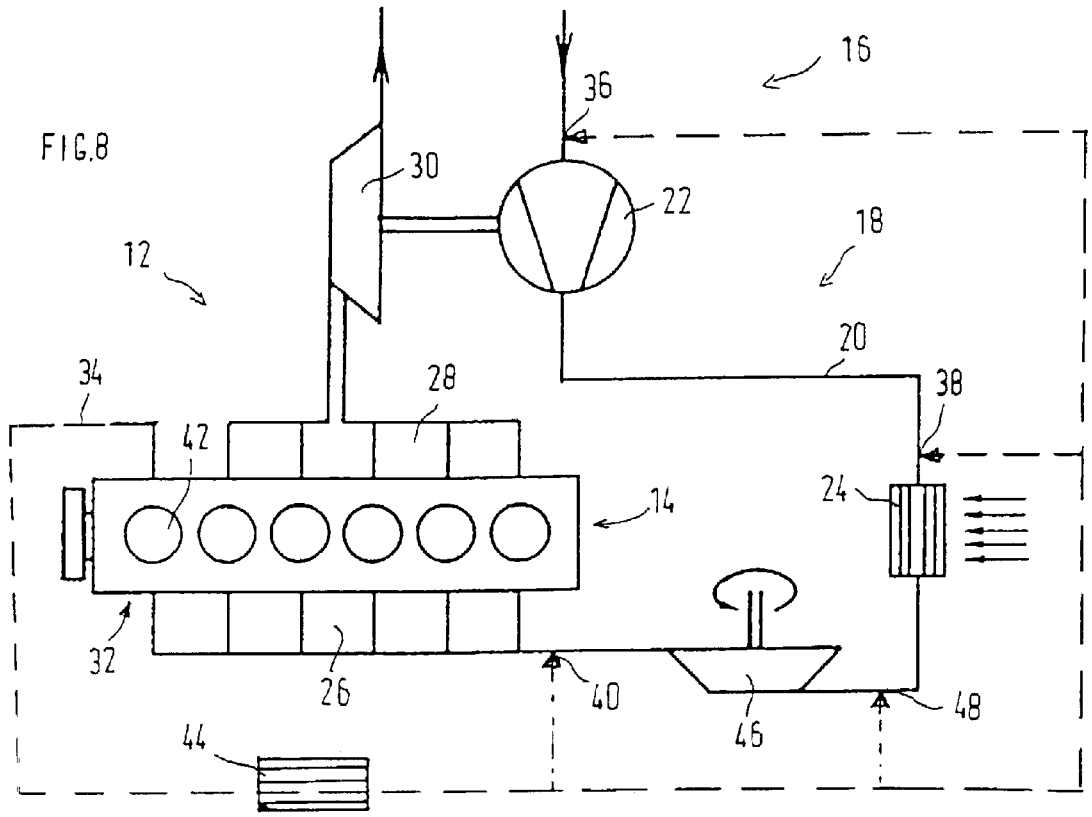

METHOD FOR GENERATING A HOMOGENEOUS MIXTURE FOR AUTO-IGNITION INTERNAL COMBUSTION ENGINES AND FOR CONTROLLING THE COMBUSTION PROCESS

FIELD OF THE INVENTION

The invention proceeds from a method for generating a homogeneous mixture for auto-ignition internal combustion engines and for controlling the combustion process.

BACKGROUND INFORMATION

During the combustion of a homogeneous fuel/air mixture, as a result of decentral activation a parallel release of energy is achieved, in contrast to conventional processes, in which, as a result of central activation by means of an ignition source (Otto process) or by means of injection (Diesel process), a serial combustion of the charge, with a gradually propagating flame front, occurs. Particular advantages of homogeneous combustion as a result of decentral activation of the charge arise from the substantially lower temperature level, that is local peak temperatures are avoided. This results in lower $NO_x$ emissions. Due to the homogeneous distribution of the fuel, the soot emissions fall, and as a result of the complete oxidation of C into $CO_2$, advantages in terms of fuel consumption can be achieved.

It is therefore desirable, when a mixture of fuel and air is formed, to have a homogeneous mixture for the purpose of a combustion process which is optimized with regard to exhaust gas and fuel consumption. In diesel internal combustion engines, combustion ideally occurs by virtue of the auto-ignition of a more or less homogeneous mixture of diesel fuel and air. Attempts have been made to perform this homogeneous mixture formation both in the suction pipe and in the combustion space. However, problems have been the high boiling temperature and wide boiling range of diesel fuel, so that, for example in compression-stroke injection or suction pipe injection, with otherwise unchanged control times of the inlet and outlet valves, the time for the evaporation of all the components of the diesel fuel is too short and the temperatures are too low. Moreover, ignition is too early because of the high cetane number of diesel fuel and therefore does not have optimal efficiency. Another problem is a rapid reaction of the homogeneous mixture and the accompanying high pressure rise.

It is an object of the present invention is based is to provide a method for generating a homogeneous mixture for auto-ignition internal combustion engines and for controlling the combustion process, in which an uncontrolled and too early ignition of the mixture is prevented.

SUMMARY

The combination according to the present invention of exhaust-gas recirculation or exhaust-gas retention with injection of fuel into the recirculated or retained exhaust gas and subsequent cooling of the fuel/air mixture yields two parameters for controlling the combustion process, in order to achieve an optimal position of the combustion center of gravity and smaller pressure rises.

On the one hand, fuel is injected into the retained or recirculated hot exhaust gas of the preceding combustion cycle, in order to obtain a homogeneous fuel/air mixture. In this case, the quantity and temperature or the energy of the retained or recirculated exhaust gas constitutes an essential correcting variable, by means of which the combustion process, in particular the start and duration of reaction/combustion or the center of gravity of the charge, can be controlled and regulated.

On the other hand, the retained or recirculated exhaust gas is cooled, in order to prevent premature ignition. Cooling lowers the final compression temperature and, by freezing the prereactions, prevents uncontrolled premature ignition of the homogeneous charge. The cooled, recirculated or retained exhaust gas acts as an inhibitor and thus ensures smooth combustion. Furthermore, the combustion center of gravity is shifted to the rear for optimal efficiency. Load regulation can then be performed by a variation in the injected fuel quantity.

According to one embodiment of the present invention, the cooling of the homogeneous fuel/air mixture occurs as a result of expansion cooling by means of late inlet-valve opening or early inlet-valve closing (Miller method). If, for example, the inlet valve is closed relatively early, the cylinder fills up with fresh charge only incompletely, and the charge in the cylinder expands during the intake stroke and cools even before the compression stroke.

In a further embodiment of the present invention, at least part of the exhaust gas of a dispenser cylinder of the internal combustion engine is retained or recirculated, in order to inject fuel into this exhaust gas in order to generate a homogeneous fuel/air mixture both for the dispenser cylinder and for the remaining cylinders of the internal combustion engine, the homogeneous fuel/air mixture being cooled before being fed into a common intake device of the dispenser cylinder and the remaining cylinders, preferably by means of a cooling device which operates according to the compressor refrigerating process, the adsorption refrigerating process, the gas refrigerating process, the steam-jet refrigerating process, an electro thermal method or a combination of the processes mentioned.

The auto-ignition internal combustion engine may be provided with an exhaust-gas turbocharger device, and the intake device may have a compressor and also a charge-air cooler downstream of the latter and a downstream expansion turbine, the homogeneous fuel/air mixture being fed into the intake device selectively at one or more connecting points, of which one connecting point is arranged upstream of the compressor, one connecting point between the compressor and the charge-air cooler, one connecting point between the charge-air cooler and the expansion turbine and one further connecting point between the expansion turbine and an intake manifold of the internal combustion engine.

By the homogenized and precooled fuel/air mixture being recirculated into the intake device, it is thoroughly mixed with fresh intake gas. The subsequent further cooling of the fresh gas mixed with homogeneous fuel/air mixture by means of the charge-air cooler and/or the expansion turbine (turbo-cooling) ensures a substantially higher total intake mass, with the result that the thermal throttling caused by the higher temperature of the fuel/air mixture recirculated into the intake device and therefore power losses are reduced. Due to the lower final compression temperature which is possible by means of turbo-cooling, the auto-ignition of the homogeneous mixture does not occur prematurely, but may be adjusted, by the turbo-cooling parameters being regulated, so that it occurs with optimal efficiency in the region of ignition top dead center.

BRIEF DESCRIPTION OF THE DRAWINGS

FIGS. 3a to 3f show the cylinder/piston unit of FIG. 1 in different crank-angle positions, to illustrate a further embodiment of the method according to the invention;

FIG. 4 is a graph, in which the piston travel and ranges for the valve control times of the internal combustion engine of FIG. 3 are illustrated against the crank angle;

FIGS. 5a to 5f show the cylinder/piston unit of FIG. 1 in different crank-angle positions, to illustrate a further embodiment of the method according to the invention;

FIG. 6 is a graph, in which the piston travel and ranges for the valve control times of the internal combustion engine of FIG. 5 are illustrated against the crank angle;

FIG. 7 is a schematic view of an auto-ignition internal combustion engine with turbocharging, in which a further embodiment of the method according to the invention is implemented;

FIG. 8 is a schematic view of a further auto-ignition internal combustion engine with turbocharging, which is additionally provided with an expansion turbine.

DETAILED DESCRIPTION

Figure 1A:
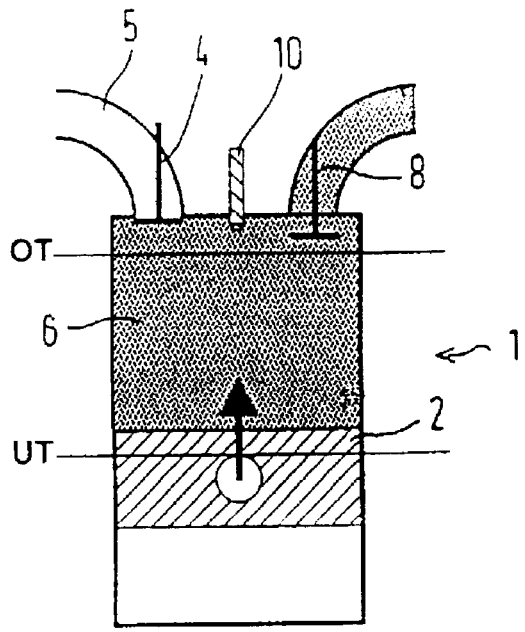
FIGS. 1a to 1g are schematic views of a cylinder/piston unit of an auto-ignition internal combustion engine in various crank-angle positions, to illustrate a preferred embodiment of the method according to the invention.

To illustrate one embodiment of the method according to the present invention, FIGS. 1a to 1g illustrate a cylinder/piston unit 1 of an auto-ignition internal combustion engine, with a piston 2 moving periodically between bottom dead center UT and top dead center OT. The cylinder/piston unit 1 includes an inlet valve 4, through which fresh gas guided along an intake device, otherwise not illustrated, can flow through an intake duct 5 into a combustion space 6, and also an outlet valve 8 for the outlet of exhaust gas. Moreover, a, for example, central injection nozzle 10 is arranged on the head of the cylinder/piston unit 1. The motive combustion process of the auto-ignition internal combustion engine may be a conventional four-stroke process with an intake stroke, a compression stroke, a working stroke and an exhaust stroke.

Figure 1B:
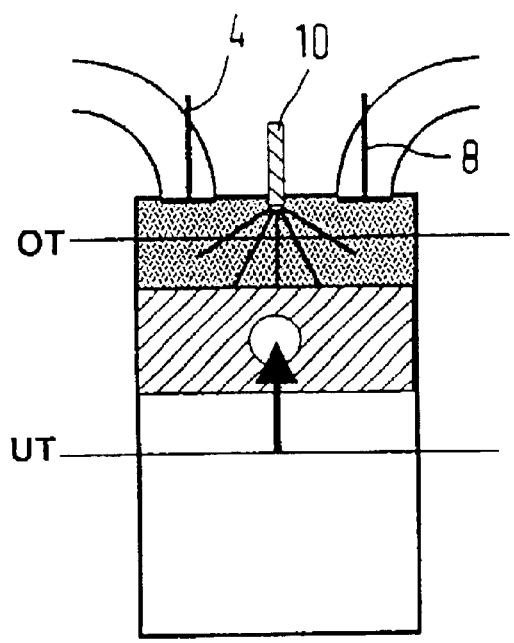
Figure 1C:
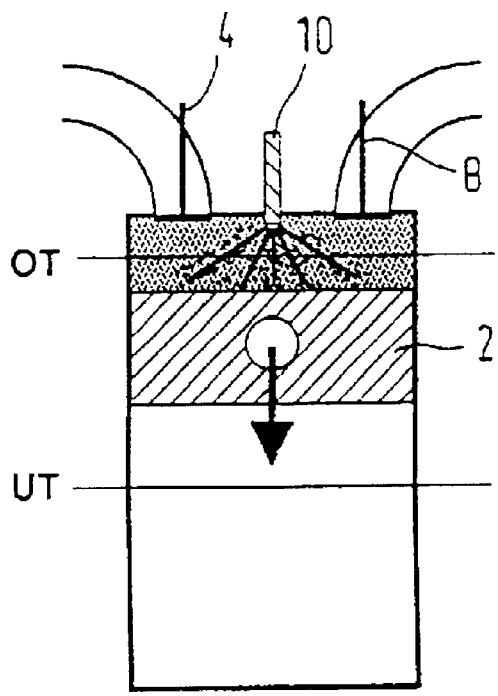
Figure 1D:
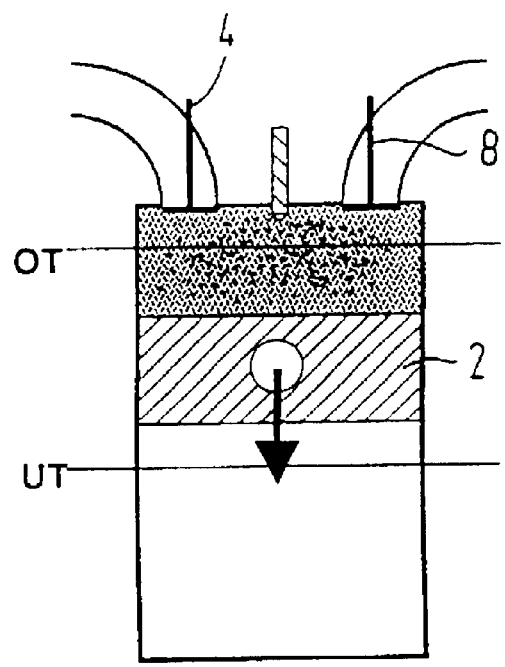

In order to obtain as homogeneous a fuel/air mixture as possible, the fuel is injected into hot exhaust gas. For this purpose, first, exhaust-gas retention is performed in the combustion space 6, until the outlet valve 8 is closed early during the exhaust stroke illustrated in FIG. 1a. Thereafter, an injection phase shown in FIG. 1b and FIG. 1c is performed, during which fuel is injected through the injection nozzle 10 into the hot exhaust gas retained in the combustion space 6, whereupon the injected fuel evaporates and prereactions take place (FIG. 1d). In order to prevent the fuel jet from impinging on the combustion-space wall, injection may also be performed intermittently.

Figure 1E:
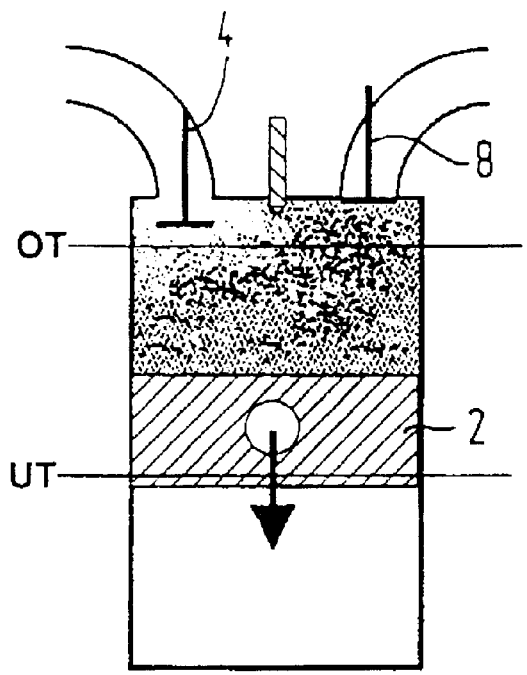
Figure 1F:
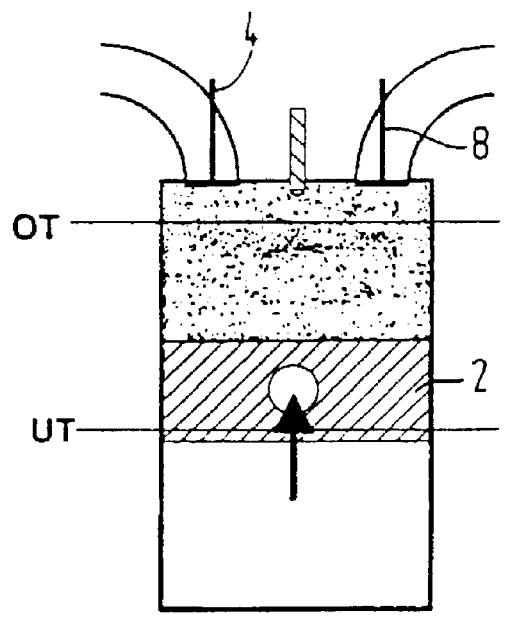
Figure 1G:
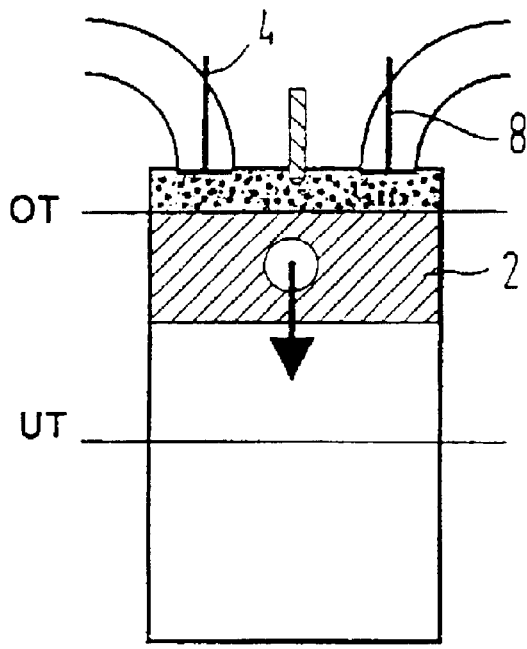

In order to stop the prereactions, expansion cooling is subsequently performed, for example, according to the so-called Miller method, in that, during the intake movement of the piston 2, the inlet valve 4 is opened only late (FIG. 1d and FIG. 1e). The inflowing fresh gas ensures additional homogenization of the fuel/air mixture. Alternatively, to generate expansion cooling, the inlet valve 4 may also close earlier. The final compression temperature is thereby lowered in the subsequent compression stroke, shown in FIG. 1f, which triggers the ignition of the fuel/air mixture. Instead of serial combustion of the charge, with a gradually propagating flame front, on account of the homogeneous nature of the charge, simultaneous decentral activation occurs at a large number of points and makes it possible to have a parallel release of energy. Moreover, local peak temperatures are avoided because the ignition of the charge takes place simultaneously at a large number of points.

Figure 2:
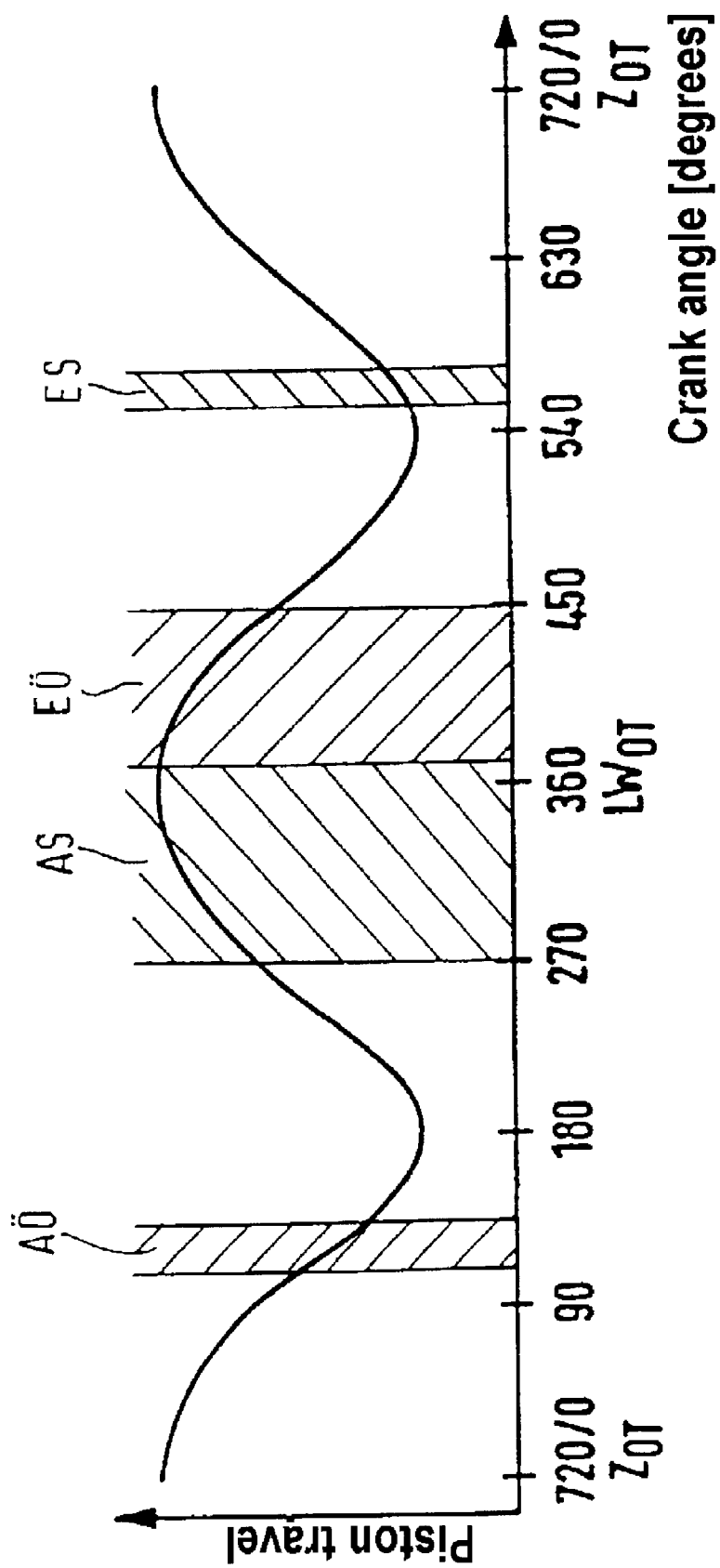
FIG. 2 is a graph in which the piston travel and ranges for the valve control times of the internal combustion engine of FIG. 1 are illustrated against the crank angle.

FIG. 2 shows in detail, in graph form, the piston travel and ranges for the valve control times of the cylinder/piston unit 1 of FIG. 1 as a function of the crank angle. Starting with a crank angle of zero degrees, the piston 2 is at ignition top dead center $Z_{OT}$ which initiates the working stroke of the internal combustion engine. Before the following bottom dead center UT of the piston is reached, the outlet valve 8 opens (designated as AÖ in FIG. 2) in order to initiate the exhaust stroke, for example in a crank-angle range of between 110 degrees and 140 degrees (FIG. 1a).

For the retention of exhaust gas in the combustion space, the outlet valve 8 is closed early (designated as AS in FIG. 2), this preferably occurring in a crank-angle range of between 270 degrees and 369 degrees. Thereafter, fuel is injected into the retained hot exhaust gas of the preceding combustion cycle, preferably in a crank-angle range which is limited by the outlet-valve closing AS and the inlet-valve opening EÖ, in order to obtain a homogenized fuel/exhaust-gas mixture. Instead, then, as is conventional, of opening the inlet valve 4 (EÖ in FIG. 2) shortly before a charge-exchange top dead center $LW_{OT}$ is reached at a crank angle of 360 degrees, this occurs later, for example in a crank-angle range of between 370 degrees and 450 degrees, in order, initially, to perform expansion cooling of the fuel/exhaust-gas mixture (FIG. 1e). The relatively small fresh-gas quantity obtained as a result of late inlet-valve opening EÖ can be compensated by a charging of the internal combustion engine. Finally, the inlet valve 4 is closed in a crank-angle range of between 550 degrees and 570 degrees (ES in FIG. 2). Finally, during the subsequent compression of the fresh-gas/fuel/exhaust-gas mixture, the auto-ignition of the latter is triggered in the region of ignition top dead center $Z_{OT}$.

The control times of the inlet and outlet valves 4, 8 may be implemented via corresponding cams of the camshaft. Alternatively, variably activatable valves, for example electromagnetic valves, may also be used.

FIGS. 3a to 3f illustrate the combustion process with reference to the cylinder/piston unit 1 in a further embodiment of the method according to the present invention. FIG. 4 shows the corresponding piston-travel/crank-angle graph. The components and the control times are designated, here, by the same abbreviations and reference numerals as in the embodiment described above.

As before, the outlet valve 8 is opened (AÖ) in a crank-angle range of between 110 degrees and 140 degrees, in order partially to expel exhaust gases located in the combustion space 6 (FIG. 3a). As a result of early inlet-valve opening EÖ and simultaneous outlet-valve closing AS, such as during the exhaust stroke in a crank-angle range of between 270 degrees and 360 degrees, the remaining hot exhaust gas is pushed, for exhaust-gas retention, into the intake duct 5 containing the injection nozzle 10 (FIG. 3b), and fuel is injected into the hot exhaust gas, for example, in a crank-angle range between inlet-valve opening EÖ and a crank angle of 5 degrees before inlet-valve closing ES, the exhaust gas thereupon evaporating. The subsequent downward movement of the piston 2 during the intake stoke ensures the intake of the fuel/exhaust-gas mixture formed in the intake duct 5 and of fresh gas homogenized together with the mixture into the combustion space 6 (FIG. 3c). As a result of inlet-valve closing ES, for example in a crank-angle range of between 460 and 560 degrees, and of the further downward movement of the piston 2, the fuel/air mixture located in the combustion space is expansion-cooled (FIG. 3d). Finally, within the subsequent compression stroke (FIG. 3e), auto-ignition occurs in the region of ignition top dead center $Z_{OT}$ (FIG. 3f). Instead of the entire injection quantity provided for the combustion cycle being injected completely into the intake duct 5, it is also possible to inject only part of this on the intake-duct side and the rest into the combustion space 6 via a further injection nozzle.

FIG. 5a to FIG. 5f illustrate the combustion process with reference to the cylinder/piston unit 1 in a further embodiment of the method according to the present invention, FIG. 6 showing the corresponding piston-travel/crank-angle graph.

Figure 5A:
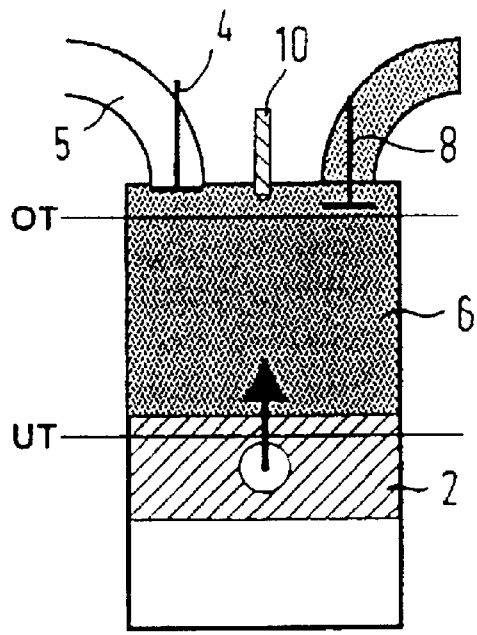
Figure 5B:
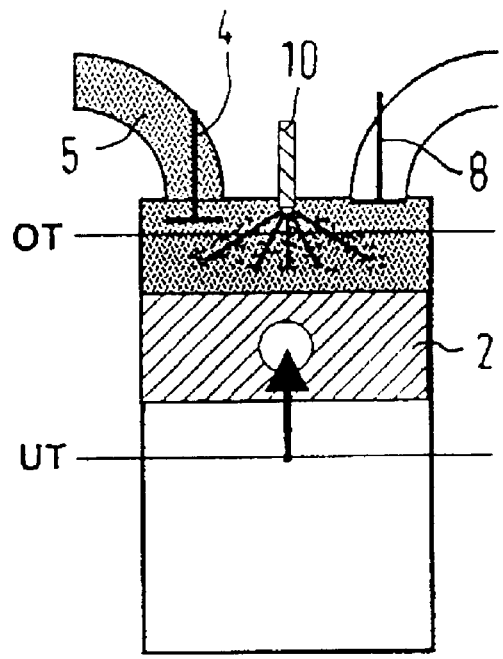
Figure 5C:
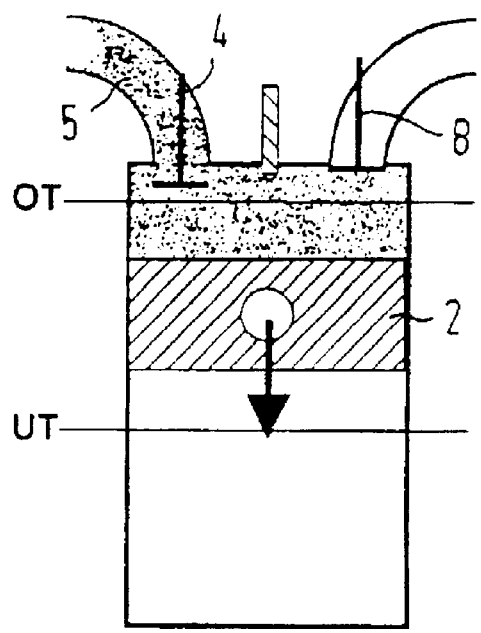
Figure 5D:
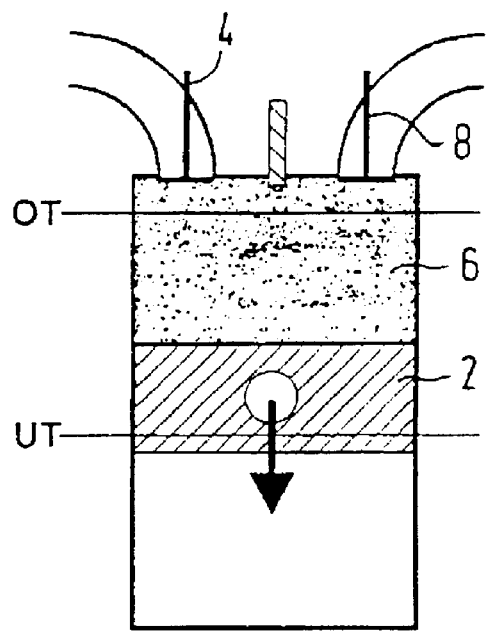

As in the embodiment described above, the outlet valve 8 is opened in a crank-angle range of between 110 degrees and 140degrees, in order partially to expel the exhaust gases located in the combustion space 6 (FIG. 5a). In contrast to this, however, the fuel is injected shortly after outlet-valve closing AS which occurs, for example, in a crank-angle range of between 270and 360 degrees. The inlet valve 4 opens in the same crank-angle range, so that the fuel/exhaust-gas mixture formed within the combustion space 6 is thereby pushed into the inlet duct 5. The flow of this mixture through the inlet valve 4 ensures good swirling and distribution of the fuel (FIG. 5b). Thereafter, the fuel/exhaust-gas mixture, together with fresh gas, is sucked through the open inlet valve 4 back into the combustion space 6 during the intake stroke (FIG. 5c). The injection operation is terminated at the latest during inlet-valve closing ES which occurs, for example, in a crank-angle range of between 460 degrees and 560 degrees. The closing of the inlet valve 4 simultaneously with a suction movement of the piston 2 results in expansion cooling of the fuel/exhaust-gas/fresh-gas mixture. Finally, the subsequent compression stroke (FIG. 5e) triggers auto-ignition (FIG. 5f) in the region of ignition top dead center $Z_{OT}$.

FIG. 7 illustrates schematically the arrangement of an auto-ignition internal combustion engine 12 with six cylinders 14, which is provided with an exhaust-gas turbocharger device 16, so that an intake device 18 of the internal combustion engine 12 in an intake line 20 comprises a single-stage or multistage compressor 22 and, for example, also a charge-air cooler 24 which is downstream of the latter and is connected on the outlet side to a common intake manifold 26 of all six cylinders 14 which serves for distributing the gas occurring in the intake line 20 to the individual cylinders 14.

While a common exhaust gas manifold 28 is provided for five of the six cylinders 14, in order to conduct the exhaust gases of these cylinders to an exhaust-gas turbine 30 driving the compressor 22 and belonging to the exhaust-gas turbocharger device 16 and to set these exhaust gases in rotation in a conventional manner, there is provided, for the sixth cylinder, a so-called dispenser cylinder 32, a recirculating line 34 which is connected to its outlet duct and is separate from the exhaust gas manifold 28 of the remaining cylinders 14 and which is led back into the intake line 20. As indicated by the broken lines in FIG. 7, the recirculating line 34 may issue into the intake line 20 selectively at a connecting point 36 upstream of the compressor, at a connecting point 38 between the compressor 22 and the charge-air cooler 24 or at a connecting point 40 between the charge-air cooler 24 and the intake manifold 26 of the internal combustion engine 12.

The arrangement described above functions as follows: The exhaust gas of the dispenser cylinder 32 serves for generating a homogeneous fuel/air mixture for all the cylinders 14 by fuel being injected into hot gas retained in a combustion space 42 of the dispenser cylinder 32 or recirculated therein. The homogeneous fuel/air mixture generated by the dispenser cylinder 32 is then fed via the recirculating line 34 into the common intake device 18 supplying all the cylinders 14.

In order to keep prereactions within limits in the cylinders 14 or even avoid giving rise to them at all, the fuel/air mixture coming from the dispenser cylinder 32, before being fed into the intake device 18, is cooled preferably by a cooling device 44 which is arranged in the recirculating line 34 and can operate according to the compressor refrigerating process, the adsorption refrigerating process, the gas refrigerating process, the steam-jet refrigerating process, an electrothermal method or a combination thereof. Alternatively or additionally, the fuel/air mixture, after being fed into the individual cylinders 14, may also be cooled expansion cooling (Miller method) according to the embodiments described above. When the fuel/air mixture is fed into the intake line 20 at one of the connecting points 36, 38 preceding the charge-air cooler 24, an already existing cooling member may be utilized and ensures additional cooling. In addition to preventing undesirable early ignitions, as described above, the cooling of the charge containing the hot fuel/air mixture before the charge is injected into the cylinders 14 makes it possible to increase its mass and thus reduce thermal throttling.

FIG. 8 illustrates a turbocharged internal combustion engine according to FIG. 7, identical or similar components and subassemblies being designated by the same reference numerals in FIG. 7. The intake device 18 of this internal combustion engine 12 contains an expansion turbine 46 which is interposed between the charge-air cooler 24 and the intake manifold 26 and may be of single-stage or multistage design. In addition to the connecting points 36, 38, 40 according to the embodiment described above, upstream of the expansion turbine 46 is provided a connecting point 48 following the charge-air cooler 24 and intended for the recirculating line 34 emanating from the dispenser cylinder 32.

Consequently, on the one hand, the fresh gas or combustion air sucked into the intake line 20 is first compressed in the compressor 22 beyond the conventional combustion-air pressure level, and the highly compressed combustion air is subsequently guided via the charge-air cooler 24 and intermediately cooled therein. Further cooling of the intake combustion air is implemented by the expansion turbine 46.

Furthermore, by the expansion turbine 46, the fuel/air mixture homogenized by the dispenser cylinder 32 is also cooled when the mixture is fed into the intake line via the recirculating line 34 at one of the three connecting points 36, 38, 48 preceding the expansion turbine 46. By an appropriate activation of the actuators used for cooling the intake charge, such as the expansion turbine 46, the charge-air cooler 24 or the cooling device 44 arranged in the recircuiting line 34, by a control and regulating device, the ignition point of the charge may be adjusted into the region of ignition top dead center $Z_{OT}$ for optimal efficiency.

A further possibility for preventing premature auto-ignition of the homogeneous fuel/air mixture is afforded by isentropic compression, such as is used, for example, in Sterling engines. In this case, the cylinder charge is cooled by means of controlled heat extraction during the compression stroke of the piston. Moreover, isentropic compression has the effect of increasing the efficiency of the combustion process.

What is claimed is:

1. A method for generating a homogeneous mixture for an auto-ignition internal combustion engine and for controlling a combustion process, the internal combustion engine including an injection system and at least one cylinder/piston unit connected to an intake device and having a combustion space, wherein the internal combustion engine includes an exhaust gas turbocharger device and the intake device includes a compressor and a charge-air cooler disposed downstream of the compressor, wherein the compressor is configured to compress combustion air and the charge-air cooler is configured to cool the combustion air, the method comprising the steps of:

one of recirculating hot exhaust gas from a previous combustion cycle into one of the combustion space and the intake device and retaining hot exhaust gas in one of the combustion space and the intake device;

injecting fuel by the injection system into the one of the recirculated hot exhaust gas and the retained hot exhaust gas to generate a homogeneous fuel/air mixture;

cooling the homogenized fuel/air mixture by at least one of expansion cooling in the respective cylinder/piston unit, isentropic compression in the respective cylinder/piston unit, expansion cooling of fuel/air mixture homogenized in at least one further cylinder/piston unit, external cooling of a fuel/air mixture homogenized in at least one further cylinder/piston unit;

further cooling the combustion air by a selectively single-stage or two-stage expansion turbine disposed downstream of the charge-air cooler;

recirculating the cooled fuel/air mixture into the intake device;

feeding the homogeneous fuel/air mixture into the intake device selectively in at least one connecting point, one connecting point being arranged upstream of the compressor, one connecting point being disposed between the compressor and the charge-air cooler, and one connecting point being disposed between the charge-air cooler and an intake manifold of the internal combustion engine; and supplying the homogeneous fuel/air mixture to the intake device at an additional connecting point disposed between the charge-air cooler and the expansion turbine.

2. A method for generating a homogeneous mixture for an auto-ignition internal combustion engine and for controlling a combustion process, the internal combustion engine including an injection system and at least one cylinder/piston unit connected to an intake device and having a combustion space, the combustion process including a four-stroke process, which includes an intake stroke, a compression stroke, a working stroke and an exhaust stroke, wherein the compression stroke includes an isentropic compression, the method comprising the steps of:

one of recirculating hot exhaust gas from a previous combustion cycle into one of the combustion space and the intake device and retaining hot exhaust gas in one of the combustion space and the intake device;

injecting fuel by the injection system into the one of the recirculated hot exhaust gas and the retained hot exhaust gas to generate a homogeneous fuel/air mixture;

cooling the homogenized fuel/air mixture by at least one of expansion cooling in the respective cylinder/piston unit, isentropic compression in the respective cylinder/piston unit, expansion cooling of fuel/air mixture homogenized in at least one further cylinder/piston unit, external cooling of a fuel/air mixture homogenized in at least one further cylinder/piston unit; and recirculating the cooled fuel/air mixture into the intake device.

3. A method for generating a homogeneous mixture for an auto-ignition internal combustion engine and for controlling a combustion process, the internal combustion engine including an injection system and at least one cylinder/piston unit connected to an intake device and having a combustion space, the method comprising the steps of:

one of recirculating hot exhaust gas from a previous combustion cycle into one of the combustion space and the intake device and retaining hot exhaust gas in one of the combustion space and the intake device;

injecting fuel by the injection system into the one of the recirculated hot exhaust gas and the retained hot exhaust gas to generate a homogeneous fuel/air mixture;

cooling the homogenized fuel/air mixture by at least one of expansion cooling in the respective cylinder/piston unit, isentropic compression in the respective cylinder/piston unit, expansion cooling of fuel/air mixture homogenized in at least one further cylinder/piston unit, external cooling of a fuel/air mixture homogenized in at least one further cylinder/piston unit; and recirculating the cooled fuel/air mixture into the intake device.

4. The method according to claim 3, wherein the combustion process includes a four-stroke process, which includes an intake stroke, a compression stroke, a working stroke and an exhaust stroke.

5. The method according to claim 3, wherein the one of the retaining and recirculating step includes the substep of one of retaining and recirculating at least part of the exhaust gas of a dispenser cylinder of the internal combustion engine;

wherein the fuel injecting step includes the substep of injecting fuel into the part of the exhaust gas to generate a homogeneous fuel/air mixture for the dispenser cylinder and for remaining cylinders of the internal combustion engine;

and wherein the cooling step includes the substep of at least one of cooling the homogeneous fuel/air mixture before being fed into a common intake device of the dispenser cylinder and the remaining cylinders in a cooling device by at least one of a compressor refrigerating process, an adsorption refrigerating process, a gas refrigerating process, a steam-jet refrigerating process and an electrothermal process and expansion cooling the homogeneous fuel/air mixture in the cylinders after being fed into the intake device.

6. The method according to claim 3, wherein the internal combustion engine includes an exhaust gas turbocharger device and the intake device includes a compressor and a charge-air cooler disposed downstream of the compressor, the method further comprising the step of feeding the homogeneous fuel/air mixture into the intake device selectively in at least one connecting point, one connecting point being arranged upstream of the compressor, one connecting point being disposed between the compressor and the charge-air cooler, and one connecting point being disposed between the charge-air cooler and an intake manifold of the internal combustion engine.

7. A method for generating a homogeneous mixture for an auto-ignition internal combustion engine and for controlling a combustion process, the internal combustion engine including an injection system and at least one cylinder/piston unit connected to an intake device and having a combustion space, the combustion process including a four-stroke process, which includes an intake stroke, a compression stroke, a working stroke and an exhaust stroke, the method comprising the steps of:

one of recirculating hot exhaust gas from a previous combustion cycle into one of the combustion space and the intake device and retaining hot exhaust gas in one of the combustion space and the intake device;

injecting fuel by the injection system into the one of the recirculated hot exhaust gas and the retained hot exhaust gas to generate a homogeneous fuel/air mixture;

cooling the homogenized fuel/air mixture by at least one of expansion cooling in the respective cylinder/piston unit, isentropic compression in the respective cylinder/piston unit, expansion cooling of fuel/air mixture homogenized in at least one further cylinder/piston unit, external cooling of a fuel/air mixture homogenized in at least one further cylinder/piston unit; and recirculating the cooled fuel/air mixture into the intake device;

wherein the internal combustion engine includes an inlet valve, the expansion cooling being performed in accordance with one of a late inlet valve opening and an early inlet valve closing.

8. The method according to claim 7, wherein the internal combustion engine further includes an outlet valve, the method further comprising the step of controlling the inlet valve, the outlet valve and the injection system so that by early outlet valve closing during the exhaust stroke, hot exhaust gas is retained in the combustion space, fuel is injected into the hot exhaust gas to generate the homogeneous fuel/air mixture and the homogeneous fuel/air mixture is expansion-cooled by late inlet valve opening during the intake stroke.

9. The method according to claim 8, wherein when a charge-exchange top dead center of a piston of the cylinder/piston unit is defined by a crank angle of 360°, the combustion process is defined by the following characteristics:

outlet valve opening in a crank angle range between 110° and 140°;

outlet valve closing in a crank angle range between 270° and 369°;

inlet valve opening in a crank angle range between 370° and 450°;

inlet valve closing in a crank angle range between 550° and 570°; and injection of fuel between the outlet valve closing and the inlet valve opening.

10. The method according to claim 7, wherein the internal combustion engine further includes an outlet valve and the intake device includes an intake duct, the method further comprising the step of controlling the inlet valve, the outlet valve and the injection system so that during the exhaust stroke, hot exhaust gas from the combustion space is expelled through an open inlet valve into the intake duct, fuel is injected into the hot exhaust gas and fresh intake gas in the intake duct, and, during the intake stroke, the fuel/air mixture is sucked from the intake duct back into the combustion space and is expansion cooled after the early closing of the inlet valve.

11. The method according to claim 10, wherein, when a charge-exchange top dead center of a piston of the cylinder/piston unit is defined by a crank angle of 360°, the combustion process is defined by the following characteristics:

outlet valve opening in a crank angle range between 110° and 140°;

outlet valve closing in a crank angle range between 270° and 360°;

inlet valve opening in a crank angle range between 270° and 360°;

inlet valve closing in a crank angle range between 460° and 560°; and injection of fuel between the inlet valve opening and a crank angle of 5° before the inlet valve closing.

12. The method according to claim 7, wherein the intake device includes an intake duct, the method further comprising the steps of:

injecting fuel during the exhaust stroke into the combustion space shortly after the closing of the outlet valve and substantially simultaneously therewith;

opening the inlet valve to expel the fuel/exhaust gas mixture formed within the combustion space into the intake duct;

sucking the fuel/exhaust gas mixture with fresh gas through the open inlet valve back into the combustion space during the intake stroke; and closing the inlet valve simultaneously with the suction of the piston to achieve expansion cooling of the fuel/exhaust gas/fresh gas mixture.

13. The method according to claim 12, wherein, when a charge-exchange top dead center of a piston of the cylinder/piston unit is defined by a crank angle of 360°, the combustion process is defined by the following characteristics:

outlet valve opening in a crank angle range between 110° and 140°;

outlet valve closing in a crank angle range between 270° and 360°;

inlet valve opening in a crank angle range between 270° and 360°;

inlet valve closing in a crank angle range between 460° and 560° and injection of fuel between the outlet valve closing and the inlet valve closing.

* * * * *